United States Patent
Choo et al.

(10) Patent No.: US 7,693,163 B2
(45) Date of Patent: Apr. 6, 2010

(54) METHOD OF OPERATING INTERNET PROTOCOL ADDRESS AND SUBNET SYSTEM USING THE SAME

(75) Inventors: Ho Cheol Choo, Seoul (KR); Seok Joon Jang, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 827 days.

(21) Appl. No.: 11/441,981

(22) Filed: May 26, 2006

(65) Prior Publication Data

US 2006/0271682 A1    Nov. 30, 2006

(30) Foreign Application Priority Data

May 30, 2005    (KR)    ............ 10-2005-0045625

(51) Int. Cl.
| | |
|---|---|
| H04L 12/56 | (2006.01) |
| H04L 12/28 | (2006.01) |
| G06F 15/173 | (2006.01) |
| G06F 15/16 | (2006.01) |

(52) U.S. Cl. .............. 370/401; 370/255; 370/389; 370/392; 370/393; 370/408; 709/220; 709/222; 709/224; 709/250

(58) Field of Classification Search ......... 370/252–503; 709/220–224
See application file for complete search history.

(56) References Cited

U.S. PATENT DOCUMENTS

| | | | |
|---|---|---|---|
| 5,751,971 A * | 5/1998 | Dobbins et al. ............. 709/238 |
| 6,249,820 B1 * | 6/2001 | Dobbins et al. ............. 709/238 |
| 6,532,217 B1 * | 3/2003 | Alkhatib et al. ............. 370/252 |
| 6,578,087 B1 * | 6/2003 | Garakani et al. ............ 709/242 |
| 6,741,585 B1 * | 5/2004 | Munoz et al. ................ 370/352 |
| 6,754,181 B1 * | 6/2004 | Elliott et al. ................. 370/252 |
| 7,139,269 B2 * | 11/2006 | Kalkunte et al. ............. 370/389 |
| 7,315,903 B1 * | 1/2008 | Bowden ...................... 709/250 |
| 7,499,450 B2 * | 3/2009 | Foglar et al. ................. 370/392 |
| 2002/0172207 A1 * | 11/2002 | Saito et al. ................... 370/400 |
| 2003/0112808 A1 * | 6/2003 | Solomon ...................... 370/400 |
| 2005/0047348 A1 * | 3/2005 | Suzuki et al. ................ 370/252 |
| 2005/0074015 A1 * | 4/2005 | Chari et al. ................... 370/400 |
| 2005/0089027 A1 * | 4/2005 | Colton ......................... 370/380 |
| 2005/0174998 A1 * | 8/2005 | Vesterinen et al. ........... 370/354 |
| 2005/0243818 A1 * | 11/2005 | Foglar et al. ................. 370/389 |

* cited by examiner

*Primary Examiner*—Ayaz R Sheikh
*Assistant Examiner*—Venkatesh Haliyur
(74) *Attorney, Agent, or Firm*—H.C. Park & Associates, PLC

(57) ABSTRACT

A method of operating an Internet protocol (IP) address that effectively allocates, creates, and processes an interface identifier (ID) of an IP address area, and a subnet system using the same are provided. Allocation is done such that in the IP address area including a subnet prefix area and an Interface ID area, certain bits of the Interface ID area are used as an index area of a subnet gateway. In this case, the allocation is implemented in order from the higher layer to the lower layer so that the Interface ID area is sequentially allocated from the higher bits thereof for the index areas of the respective layers. The combination of the certain bits of the allocated Interface ID and the subnet prefix area of the IP address area is used as the subnet ID of the respective subnet layers. The lowest subnet gateway allocates the Interface ID to terminating equipment trying to access to the IP network based on a format of the IP address.

6 Claims, 3 Drawing Sheets

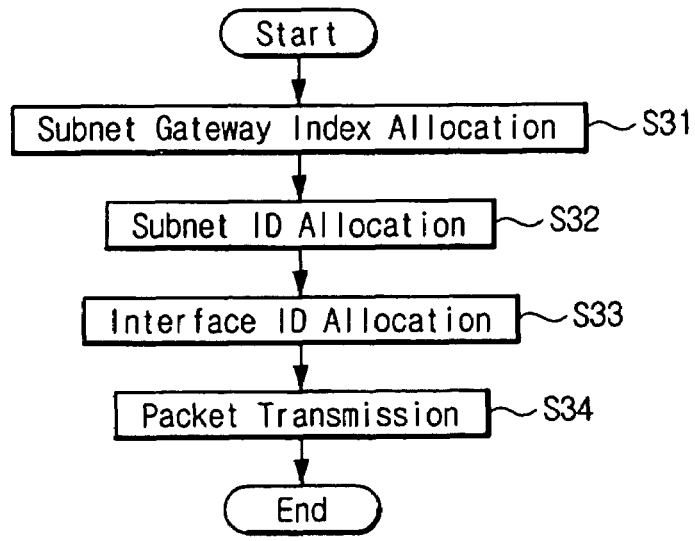
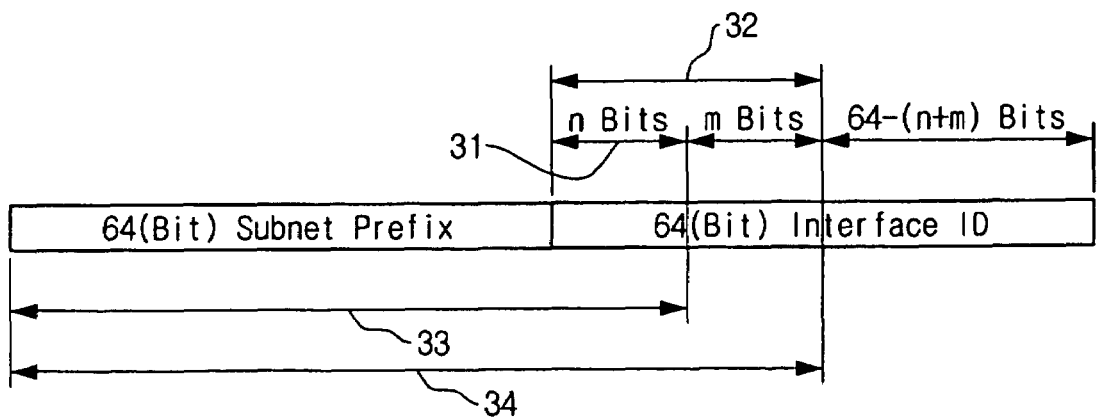

METHOD OF OPERATING INTERNET PROTOCOL ADDRESS AND SUBNET SYSTEM USING THE SAME

CROSS-REFERENCE TO RELATED APPLICATION

The present application is claiming priority of Korean Patent Application No. 10-2005-0045625, filed on May 30, 2005, the content of which is herein incorporated by reference.

BACKGROUND OF THE INVENTION

1. Field of the Invention

The present invention relates to an Internet protocol (IP) address operation, and more particularly to a method of operating an IP address that efficiently allocates, creates, and processes an interface identifier (ID) in an IP address area, and a subnet system using the same.

2. Description of the Prior Art

Generally, Internet is serviced based on an IPv4 address. Since the IPv4 uses 32 bits address space, logically, it can provide 42 hundred million address spaces. However, the allocation of IPv4 address is done in class unit so that the number of actually usable addresses is smaller than the logical one, which may result in serious lack of the number of the available addresses when used in home network, ALL-IP, and other networks and devices in the future.

To solve the above problem, an IPv6 address system has been proposed. The IPv6 address uses 128 bits address space, in which the higher order 64 bits are comprised of subnet prefix information, and the lower order 64 bits of an interface identifier (ID).

FIG. 1 illustrates a general IPv6 aggregable global unicast address format. In FIG. 1, higher order 64 bits information is allocated as subnet prefix information in accordance with Internet communication network management rule, and lower order 64 bits information is automatically created as an Interface ID by the use of identifier information provided in a network device.

In FIG. 1, the higher order 64 bits space is divided into multi areas for hierarchical allocation. The 64 bits rows as hierarchically allocated express a subnet prefix and form a complete global unicast address in combination with the Interface ID of the lower 64 bits area.

As illustrated in FIG. 1, the subnet prefix includes 3 bits Format Prefix (FP), 13 bits top level aggregation (TLA) ID, 8 bits REServed for future use (RES), 24 bits Next Level Aggregation (NLA) ID, and 16 bits Site Level Aggregation (SLA) ID. If a value of FP is '001', for example, it indicates one for aggregable global unicast address.

The Interface ID follows an EUI-64 format by the recommendation of the Internet Engineering Task Force, and the Interface ID created following such format is ensured to be a unique Interface ID for a device in a global area or a local area.

As illustrated in FIG. 2, an Interface ID with a format of EUI-64 is comprised of 24 bits Company ID and 40 bits Extension ID, and 128 bits address in combination of the corresponding Interface ID and subnet prefix interface information in the higher order 64 bits is a unique one as a global unicast address.

As described above, since the conventional IPv6 address system is comprised of 64 bits as subnet prefix information and 64 bits as Interface ID, the maximum number of the IPv6 address allocatable to a subnet and the number of the device having simultaneous access thereto can be $2^{64}$, respectively.

In this case, a gateway managing one subnet should have $2^{64}$ routing information, which is a great amount of information. Accordingly, a large amount of memory was required for simultaneous routing, and this caused a delay during matching of routing information.

SUMMARY OF THE INVENTION

Accordingly, the present invention has been made to solve the above-mentioned problems occurring in the prior art, and an object of the present invention is to provide a method of operating an IP address that efficiently allocates, creates, and processes an interface identifier (ID) in an IP address area, and a subnet system using the same.

Another object of the present invention is to constitute a subnet gateway hierarchically for an interface identifier (ID) of an IPv6 address area to distribute a load to perform an effective routing.

Still another object of the present invention is to extend subnet prefix information even to an Interface ID in an IPv6 address area to reduce the amounts of routing information of an Internet adapter upon the adaptation to a wireless a wireless network.

Yet still another object of the present invention is to operate a mobile communication terminal as an IPv6 network access point to the peripheral devices thereof to adapt it to a home networking or other various services.

Yet still another object of the present invention is to use a subnet prefix in an IPv6 address area as a subnet ID to transfer, to a lower layer gateway, routing information of a gateway managing the corresponding subnet, thereby preventing the excessive use of memory and the generation of excessive load during routing information matching.

Yet still another object of the present invention is to prevent the dissipation of IP address possibly occurring in an existing EUI-64 format, thereby performing effective management of IP address.

In order to accomplish the above objects, there is provided a method of operating an Internet protocol (IP) address, the method comprising the steps of: in an IP area including a subnet prefix area and an Interface ID area, allocating certain bits of the Interface ID area as an index area of a subnet gateway; allocating the combination of the certain bits and the subnet prefix area as the subnet ID area; and allocating an Interface ID for terminating equipment having access to an IP network based on a format of the IP address in a lowest subnet gateway.

In accordance with another aspect of the present invention, there is provided a subnet system comprising: a first gateway; and at least one lower layered gateway constituting at least one lower layer to the first gateway, wherein the respective IP address of the lower layered gateway constituting the lower layer to the first gateway uses certain bits of an Interface ID area of the IP address of the of the IP address of the first gateway as each index area.

In the present invention, the higher order 64 bits subnet prefix value in the IPv6 address area is allocated as a unique one in a global area. That is, the present invention ensures the provision of a single Interface ID on the same link using the same sub prefix. Accordingly, it can be ensured a single global unicast address without following a conventional EUI-64 format. In addition, in this context, the subnet gateway serves to create and allocate Interface IDs, and to manage the respective Interface IDs to be the single ones without being overlapped on the link, thereby managing address and routing information effectively.

To this end, the present invention uses, as the index area of the subnet gateway, the certain bits of the lower 64 bits Interface ID in the IPv6 address area. In addition, the present invention uses, as a subnet ID, the combination of higher 64 bits subnet prefix and certain part of the corresponding Interface ID, thereby performing a routing using the certain part of the corresponding Interface ID. At this time, the index area of the corresponding subnet gateway is separately allocated to each subnet layer so that the lowest gateway creates an Interface ID to be allocated to terminating equipment.

BRIEF DESCRIPTION OF THE DRAWINGS

The above and other objects, features and advantages of the present invention will be more apparent from the following detailed description taken in conjunction with the accompanying drawings, in which:

FIG. 3 is a flow chart illustrating a method of operating an Internet protocol (IP) according to an embodiment of the present invention;

FIG. 4 illustrates a construction of the IP address according to the embodiment of FIG. 3.

DETAILED DESCRIPTION OF THE PREFERRED EMBODIMENTS

Hereinafter, preferred embodiments of the present invention will be described with reference to the accompanying drawings.

A method of operating an Internet protocol (IP) address according to an embodiment of the present invention will be described with reference to a flow chart of FIG. 3.

First, the step is performed to allocate a certain part of the lower 64 bits area (i.e., an Interface ID area) of an IPv6 address area, for a subnet gateway index (S31). Herein, subnet prefix information can extend up to the Interface ID area, as well as the higher 64 bits area (i.e., subnet prefix) of the IPv6 address area.

That is, the certain part of the Interface ID area is hierarchically re-allocated to use even up to certain bits (e.g., 'n' (Bit)) of the lower 64 bits as the subnet prefix area.

Figure 1:
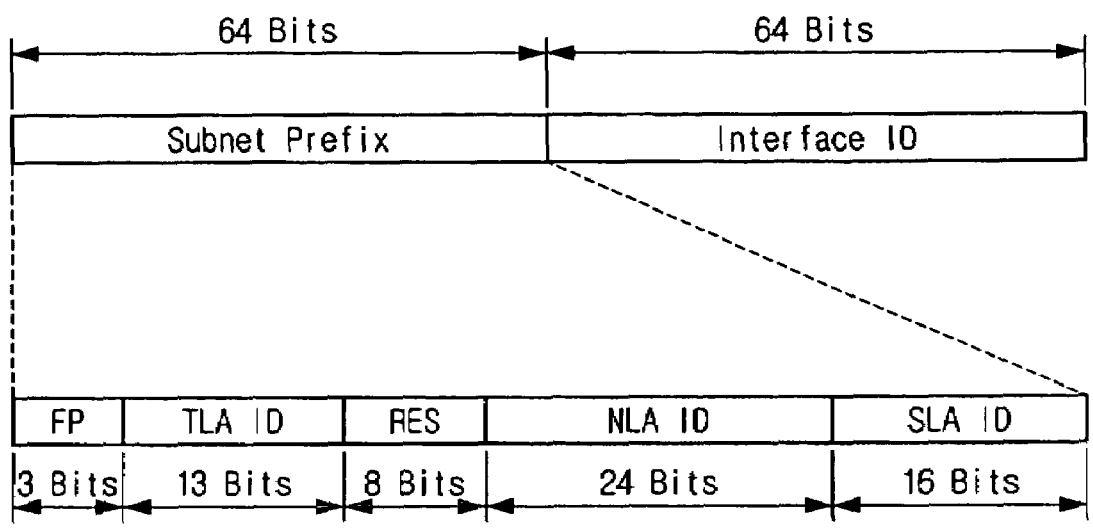
FIG. 1 illustrates a construction of a general IPv6 address.
Figure 2:
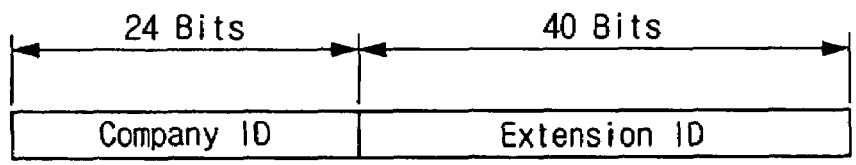
FIG. 2 illustrates a construction of an interface identifier (ID) in the IPv6 address of FIG. 1.
Figure 5:
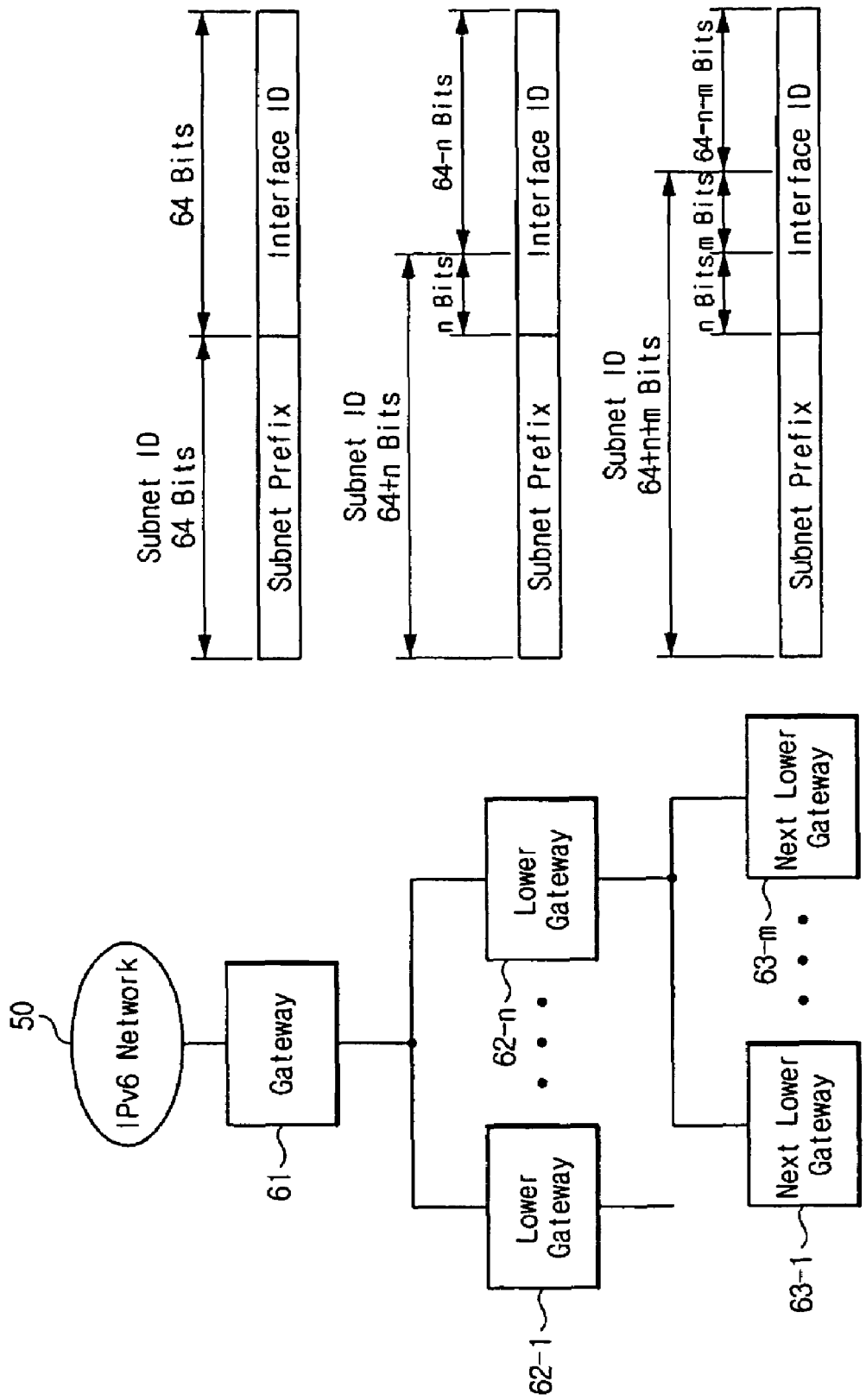
FIG. 5 illustrates a structure of a hierarchical subnet gateway and a construction of the IP address corresponding to the respective layers according to the embodiment of FIG. 3.

Furthermore, up to certain bits (e.g., 'm'(Bit)) of the lower 64-n bits is used as the subnet prefix area, so that an IP address can be used more efficiently. Description is followed on the index allocation S31 of the subnet gateway, referring to an IPv6 address format as illustrated in FIGS. 4 and 5.

First, the step is performed at the subnet gateway to allocate the certain higher bits (e.g., 'n'(Bit)) of the Interface ID area in the IPv6 address area as an index area 31 of the lower subnet gateway.

Then, the step is performed at the lower subnet gateway to allocate the certain bits (e.g., m(Bit)) after the 'n'(Bit) of the Interface ID area in the IPv6 address area as an index area 32 of the next-lower subnet gateway.

After the index allocation S31, the step is performed at the subnet gateway to allocate the combination of the higher 64 bits area (i.e., subnet prefix area) in the IPv6 address area and the certain part of the Interface ID to use as a subnet ID (S32). That is, the index of the subnet gateway allocated on the n(Bit) or n+m(Bit) area of the Interface ID area is combined with subnet prefix information of the higher 64 bits so that the combination is used as the subnet ID (the lower subnet ID 33 and the next lower subnet ID 34 in FIG. 4).

After the subnet ID allocation S32, the step is performed at the lowest subnet gateway to allocate an Interface ID to terminating equipment trying to have access to an IPv6 network based on the format of the IPv6 address formed as described above (S33). At this time, the Interface ID allocation S33 is proceeded as follows.

First, the lowest subnet gateway selects the portion of the Interface ID area that is not included in the subnet ID area to have a value (referred to hereinafter as a termination identifier) that is not overlapped with a value allocated to other terminating equipment.

Then, the lowest subnet gateway extracts the value of the Interface ID area in the area used as subnet ID, combines the extracted value with the termination identifier to create a 64 bits Interface ID, and allocates it to the termination equipment.

Like this, with the formation of a hierarchical subnet gateway using the combination of the certain bits of the Interface ID and subnet prefix information as the subnet ID, the corresponding hierarchical subnet gateway processes input packets to transmit to a destination, using the IPv6 address having access to the IPv6 network and formed as described above (S34).

At this time, the hierarchical subnet gateway, as illustrated in FIG. 5, may include an IPv6 network 50, a gateway 61 having access to the corresponding IPv6 network 50, a plurality of lower gateways 62-1 to 62-n connected to the corresponding gateway 61, and a plurality of next lower gateways 63-1 to 63-m connected to the respective lower gateways 62-1 to 62-n. In addition, note that there may further be a plurality of gateways connected to the respective next lower gateways 63-1 to 63-m.

In FIG. 5, it is configured such that the gateway 61 uses the higher 64 bits subnet prefix as a subnet ID, the respective lower gateways 62-1 to 62-n use the combination of the higher 64 bits subnet prefix and the certain bits (i.e., 'n'(Bit)) of the lower 64 bits Interface ID as a subnet ID, and the next lower gateways 63-1 to 63-m use the combination of the higher 64 bits subnet prefix and the certain bits (i.e., 'n+m' (Bit)) of the lower 64 bits Interface ID as a subnet ID.

Meanwhile, an operation of the packet transmission S34 will now be explained with reference to a hierarchical subnet gateway structure as illustrated in FIG. 5.

First, upon external input of packets, the subnet gateway 61 checks whether they are to be transmitted to its subnet. As a result, if the packets are to be transmitted to its subnet, the step is performed to mask certain higher bits (i.e., 'n'(Bit)) of the Interface ID and to transmit the masked packets to the corresponding lower subnet gateways 62-1 to 62-n matched thereto.

When receiving the packets from the higher subnet gateway 61, the lower subnet gateways 62-1 to 62-n check whether the packets are to be transmit to their subnet. Herein, if there is the more-refined next lowered subnet, the step is performed to mask the certain bits (e.g., 'm'(Bit)) after the certain higher bits (i.e., 'n'(Bit)) of the Interface ID and to forward the masked packets to the next lowered subnet gateways 63-1 to 63-m matched thereto, thereby transmitting the corresponding packets to the destination.

As described before, a method of operating an IP address according to an embodiment of the present invention performs the routing process hierarchically such that the management of vast amounts of routing information, which had been performed in a single subnet gate in the prior art, is transferred to the lower layered router, thereby managing the routing table more efficiently.

In addition, a method of operating an IP address according to an embodiment of the present invention effectively allocates the Interface ID of the IPv6 address area to use, thereby constituting the subnet gateway hierarchically and performing the load distribution and routing effectively.

In addition, with the adaptation of a method of operating an IP address according to an embodiment of the present invention to a wireless environment such as, for example, 3GPP/3GPP2 or others, the amounts of information of an Internet adapter are to be reduced so that it is easy to manage routing information and sessions in GGSN/PDSN. In addition, even in the case where a terminal is used as an IPv6 network access point for the peripheral devices thereof based on IPv6, the home networking services can be effectively performed by using a method of operating an IP address of the present invention.

As set forth before, a method of operating an IP address of the present invention constitutes a subnet gateway hierarchically, and uses a subnet prefix in an IPv6 address area as a subnet ID to transfer the amounts of routing information of the corresponding subnet gateway to the lower gateway, thereby distributing an excessive load due to the process of the received packets and performing IP address management and routing effectively.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of operating an Internet protocol (IP) address, the method comprising the steps of:
    (a) in an IP address including a subnet prefix area and an Interface ID area, allocating certain bits of the Interface ID area as an index area of a lowest subnet gateway;
    (b) allocating a first combination comprising a first portion of the certain bits and the subnet prefix area as a first subnet ID area for a lower subnet gateway, and allocating a second combination comprising the first portion, a second portion of the certain bits, and the subnet prefix area as a second subnet ID area for a next lower subnet gateway;
    (c) recreating an Interface ID using the certain bits, and allocating the Interface ID to terminating equipment having access to an IP network based on a format of the IP address in the lowest subnet gateway;
    (d) at a first subnet gateway, allocating the first portion of the certain bits as an index area of the lower subnet gateway;
    (e) at the lower subnet gateway, allocating the first portion and the second portion of the certain bits as an index area of the next lower subnet gateway; and
    wherein the lower subnet gateway processes input packets using the second combination, determines the next lower subnet gateway according to the second subnet ID area, and transmits the input packets to the next lower subnet gateway.

2. The method as claimed in claim 1, wherein the step (c) includes:
    selecting, from a portion of the Interface ID area that is not included in the certain bits, a value that is not identical to a value allocated to other terminating equipment as a termination identifier;
    extracting the certain bits from the subnet ID area; and
    allocating a combination comprising the certain bits and the termination identifier as the Interface ID for the terminating equipment.

3. The method as claimed in claim 1, further comprising a step of, at the subnet gateway, processing input packets using the IP address and transmitting them to the destination.

4. A method of operating an Internet protocol (IP) address, the method comprising:
    in an IP area including a subnet prefix area and an Interface ID area, allocating certain bits of the Interface ID area as an index area of a subnet gateway;
    allocating the combination of the certain bits and the subnet prefix area as the subnet ID area; and
    allocating an Interface ID for terminating equipment having access to an IP network based on a format of the IP address in a lowest subnet gateway; and
    at the subnet gateway, processing input packets using the IP address and transmitting them to the destination,
    wherein the packet transmission step includes:
    at the subnet gateway, checking whether external input packets are to be transmitted to its subnet;
    if the packets are to be transmitted to its subnet, masking a certain higher bits of the Interface ID and transmitting the masked packets to the corresponding lower subnet gateway matched thereto;
    at the lower subnet gateway, checking whether the packets inputted from the higher subnet gateway are to be transmitted to its subnet; and
    if the packets are to be transmitted to its subnet, masking a certain bits following the certain higher bits and forwarding the masked packets to the next lower subnet gateway matched thereto to transmit them to the corresponding destination.

5. A subnet system, comprising:
    a first gateway;
    a second gateway constituting a first lower layer relative to the first gateway,
    wherein an Internet protocol (IP) address of the second gateway uses a first portion of Interface ID area bits of an IP address of the first gateway as a first index area of the second gateway, and an IP address of a third gateway constituting a lower layer relative to the second gateway uses the first portion and a second portion of the Interface ID area bits as a second index area of the third gateway;
    wherein the subnet system further comprises a fourth gateway at the first lower layer relative to the first gateway, and an IP address of the fourth gateway uses the first portion of the Interface ID area bits of the IP address of the first gateway as a first index area of the fourth gateway; and
    wherein if information is received at the first gateway, a value of the first portion of bits of a destination IP address of the information indicates whether the information is to be routed to the second gateway or to the fourth gateway.

6. The method as claimed in claim 1, wherein the next lower subnet gateway is the lowest subnet gateway.

* * * * *